Sept. 10, 1968          C. NATER          3,400,597

OPTICAL ADJUSTMENT MEANS

Filed Sept. 15, 1966

INVENTOR.
CHARLES NATER
BY Naylor & Neal
ATTORNEYS

United States Patent Office 3,400,597
Patented Sept. 10, 1968

3,400,597
OPTICAL ADJUSTMENT MEANS
Charles Nater, Los Gatos, Calif., assignor to Laser Image Systems, Inc., Sunnyvale, Calif., a corporation of California
Filed Sept. 15, 1966, Ser. No. 579,553
5 Claims. (Cl. 74—89.15)

This invention relates to optical adjustment means and method, and more particularly to a new and different way and means to pivotally adjust an optical element, such as a lens, mirror, etc., about one or more pivotal axis or axes. In a preferred form, the optical adjustment means of the invention is orthogonal in nature and operates on the basis of a torsional principle.

An object of the invention is to provide a way and means to accomplish pivotal adjustment movement, the sensitivity of which is about an order of magnitude greater than that afforded by prior known ways and means for accomplishing such movement.

A further object of the invention is to provide a way and means to accomplish very fine, or highly sensitive, pivotal adjustment movement of such as a lens or a mirror holder plate or block without encountering any backlash force and motion, such as occurs in the environment of an orthogonal system embodying rotationally mounted pivots.

Still a further object of the invention is to provide means for torsional orthogonal optical adjustment which includes necked-down torsional portions of a flat plate having good spring qualities, first torsion applicator means in the form, for example, of one or more frame-mounted ball-end micrometers, and second or intermediate torsion applicator means in the form, for example, of one or more spring lever arms having free ends adapted to be acted upon by said ball-end micrometers, said first and second means being together adapted to effect a compounding of the sensitivity or mechanical advantage factor.

Other objects and advantages of the invention will be apparent from the following description taken in conjunction with the drawing forming part of this specification, and in which.

Figure 1:
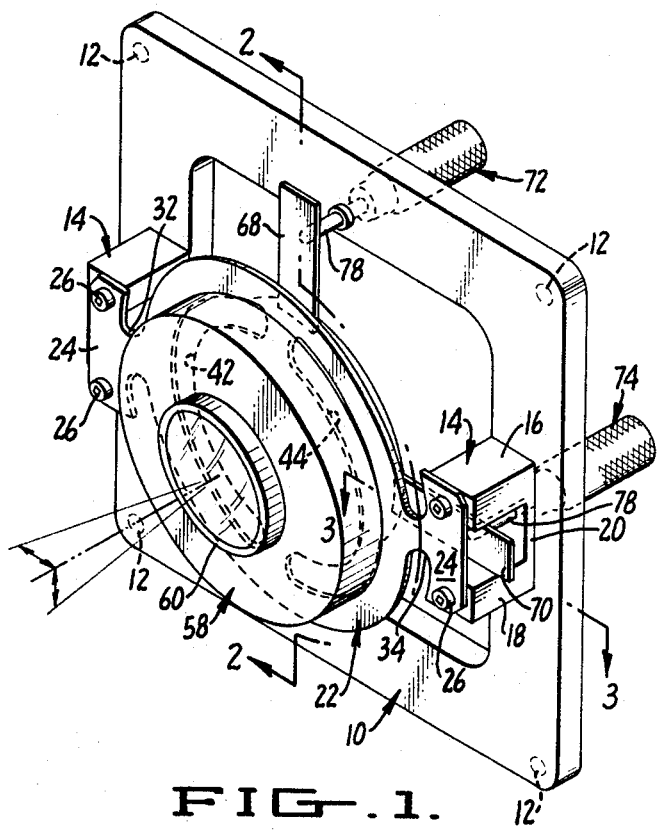
FIG. 1 is a view in perspective of a preferred form of the optical adjustment means of the invention.

Referring to the drawing, the optical adjustment device comprises a mounting or frame plate indicated generally at 10, internally threaded apertures 12 formed in plate 10 whereby the latter may be fixedly mounted, e.g. in a vertical plane, to a support member, not shown, as by externally threaded elements carried by said support member and in threaded engagement wtih the apertures 12, a pair of oppositely disposed yoke-shaped members 14 comprising horizontally disposed and spaced apart portions 16 and 18 and vertically disposed leg connecting portions 20, and a plate 22 having opposed tab portions 24 secured to leg portions 16 and 18 by cap bolts 26 which extend through members 14 into thread-connected relationship with frame plate 10.

The plate 22 is flat and is formed of a material having good spring qualities, i.e. having a spring constant, such as steel and rubber compounds. The starting plate for plate 22 is perforated, formed, milled, or otherwise processed, so that some sections are removed and others are left, thereby obtaining a physical relationship between those remaining, such that pressure or motion applied to one part is translated into torsional stress on other parts.

Thus, the starting plate for plate 22 has been cut away or relieved at 28, 28 and 30, 30 to define, respectively, oppositely disposed necked-down plate portions or torsion hinges 32 and 34, the torsion axes 36 and 38 of which are in alignment and horizontally disposed. The plate 22 is further provided with central aperture 40 and arcuate slots 42 and 44 to define an inner ring 46 and an outer ring 48, rings 46 and 48 being interconnected by oppositely disposed necked-down plate portions or torsion hinges 50 and 52, the torsion axes 54 and 56 of which are in alignment and vertically disposed.

Mounted on the obverse face of inner ring 46 of plate 22 is a holder block 58 to which a mounting ring 60 for the optical lens or mirror is attached. To the reverse of inner ring 46 there is attached an actuator block 60′ formed of complemental mating sections 62 and 64. Blocks 58 and 60′ are interconnected by cap bolts 66 which pass through bolt apertures formed in the inner ring 46. Clamped between sections 62 and 64 of actuator block 60′ are the inner ends of a pair of leaf springs 68 and 70, spring 68 subtending the torsion hinges 50 and 52 and spring 70 subtending the torsion hinges 32 and 34.

Leaf springs 68, 70 are provided with force applicator means in the form of ball-end micrometers 72 and 74, each of which is comprised of a fixed sleeve portion 76, which extends through the mounting or frame plate 10 and is threadably engaged therewith and locked thereto, and a rotatable portion comprising ball-end spindle 78 and actuator sleeve 80 fixedly secured to spindle 78, the inner end of spindle 78 being externally threaded and being in threaded engagement with sleeve portion 76.

Figure 2:
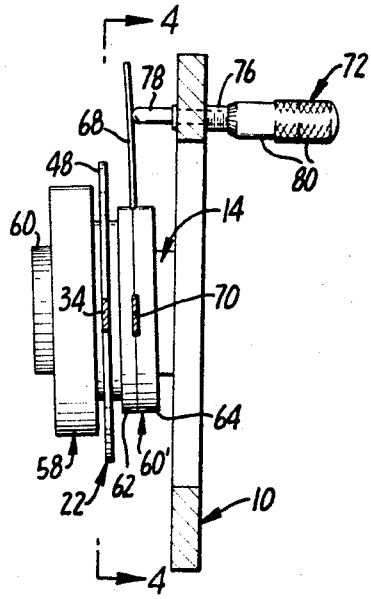
FIG. 2 is a view, partly in section and partly in elevation, taken along lines 2—2 of FIG. 1.
Figure 4:
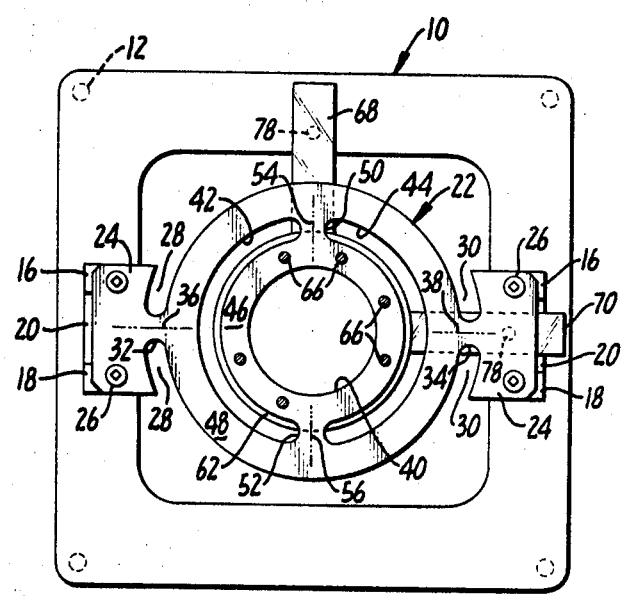
FIG. 4 is a view taken along lines 4—4 of FIG. 2.

When the micrometer associated with leaf spring 68 is actuated to move ball-end spindle 78 forwardly, or to the left (FIG. 2), spring 68 is moved in the same direction to impart pivotal movement in the counter-clockwise direction (FIG. 2) of actuator block 60′, holder block 58, and that part of plate 22 consisting of outer ring 48, necked-down portions 52, 54, and inner ring 46, such movement resulting from counter-clockwise (FIG. 2) torsional movement of the necked-down portions 32, 34 about torsional hinge axis 36, 38.

Figure 3:
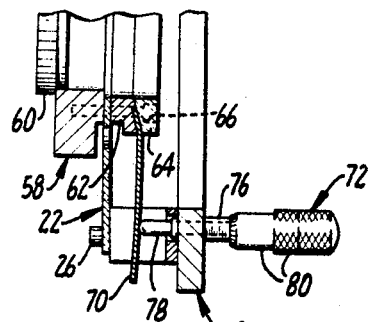
FIG. 3 is a detail view taken along lines 3—3 of FIG. 1.

When the micrometer associated with leaf spring 70 is actuated to move ball-end spindle 78 forwardly, or to the left (FIG. 3), spring 70 is moved in the same direction to impart pivotal movement in the clockwise direction (FIG. 3) of actuator block 60′, holder block 58, and that part of plate 22 consisting of inner ring 46, such movement resulting from clockwise (FIG. 3) torsional movement of the necked-down spring plate portions 50, 52 about the torsional hinge axis 54, 56.

To obtain two-way torsional pivotal movement of lens or mirror holder 60, i.e. with respect to a vertical plane and with reference to each of the two torsional hinge axes 36, 38 and 54, 56, frame or mounting plate 10 is preferably provided with a coarse adjustment, not shown, to enable the positioning of both of said hinge axes at an angle with respect to a vertical plane, the value of said angle being one-half of the desired total angle of adjustment, as to each of said hinge axes. The plate 10 being thus initially adjusted, the ball-ends of the two micrometers may be moved forwardly, or to the left (FIGS. 2–3), to the extent of one-half of their permissible throw in this direction, thereby adjusting the forward edge of holder 60 to the same vertical reference plane it occupied prior to such coarse adjustment of plate 10 and prior to engagement of leaf springs 68 and 70 by micrometer ball-ends 78.

Thereafter, holder 60 may be pivoted in each direction about axis 36, 38, as by imparting further leftward movement (FIG. 2) to spring 68 through its associated micrometer ball-end or by permitting rightward movement (FIG. 2) of spring 70 by backing off the associated ball-end.

The employment of the leaf springs 68, 70 results in greater mechanical advantage and enhanced sensitivity, as compared to direct force applications to selected areas of plate 22 by the micrometer ball-ends, or by any other suitable force applicator means. Weaker leaf springs enable greater sensitivity, i.e., a finer adjustment, or lesser degree of torsional pivotal movement, of mirror holder 60, as well as a higher mechanical advantage, per micrometer turn. For leaf springs of a given resistance to flexure, a thickening of plate 22 and/or an increase in the resistance of the necked-down, or hinge, areas to torsional movement likewise results in enhanced sensitivity and mechanical advantage.

The employment of plate 22 and its torsional pivotal properties provides a way and means for obtaining torsional pivotal adjustment which is ten and more times as sensitive as prior known ways and means for obtaining controllable orthogonal pivotal adjustment. Movements of 1 second of arc per 0.0001 inch of micrometer ball-end movement have been obtained with devices as herein shown and described.

Plate 22 may be formed of any material which has a spring constant, i.e., which will return to its original position after deformation.

Instead of two axes, plate 22 may be formed with three or more axes for special or particular adjustment system purposes. A three axis plate, for example, would have: three rings instead of the two rings 46, 48; four closed slots (two inner ones and two outer ones) instead of the two closed slots, 42, 44; and three pairs of torsional hinges, the axis of each pair being located at an acute angle of 30° and an obtuse angle of 60° with respect to the axis of each of the other two pairs.

What is claimed is:

1. A plate, formed of a material having a spring constant, comprising an inwardly disposed portion, an intermediately disposed portion, and an outwardly disposed portion, said inwardly disposed portion being connected to said intermediately disposed portion by means comprising a first pair of oppositely directed and radially extending portions constituting a first torsional hinge, said intermediately disposed portion being connected to said outwardly disposed portion by means comprising a second pair of oppositely directed and radially extending portions constituting a second torsional hinge, the axes of said first and second torsional hinges intersecting at the geometric center of said inwardly disposed portion, and means associated with said outwardly disposed portion for mounting said plate in a preselected reference plane.

2. In a device of the class described, the plate of claim 1, said axes being disposed normal to each other and within a common plane.

3. In a device of the class described, the plate of claim 2 in combination with: a first elongated leaf spring having an inner end fixed to said inwardly disposed portion and an outer free end extending outwardly of said first torsional hinge, said first spring having its longitudinal axis substantially in alignment with the axis of said first hinge; and a second elongated leaf spring having an inner end fixed to said inwardly disposed portion and an outer free end extending outwardly of said second torsional hinge, said second spring having its longitudinal axis substantially in alignment with the axis of said second hinge.

4. In a device of the class described, the combination of claim 3, including further: a support frame for said plate connected to said means associated with said outwardly disposed portion of said plate; first movable linear force applicator means carried by said support frame and adapted to engage and move said first spring and thereby conjointly pivot the inwardly and intermediately disposed portions of said plate about the axis of said second hinge; and second movable linear force applicator means carried by said support frame and adapted to engage and move said second spring and thereby pivot the inwardly disposed portion of said plate about the axis of said first hinge.

5. In a device of the class described, the combination of claim 4, further characterized as follows: said first and second torsional hinges having substantially the same torsional resistance, said first and second leaf springs having substantially the same resistance to bending, and the effective lever arm lengths of said first and second leaf springs being substantially the same, whereby equal degrees of movement of said first and second force applicator means impart, respectively, substantially equal degrees of angular movement of said inwardly disposed plate portion about each axis of said hinges.

References Cited

UNITED STATES PATENTS 3,204,471  9/1965  Rempel _____ 74—89
3,359,812  12/1967  Everitt _____ 74—89.15

FRED C. MATTERN, JR., *Primary Examiner.*

F. D. SHOEMAKER, *Assistant Examiner.*